US011967018B2

(12) United States Patent
Mason et al.

(10) Patent No.: US 11,967,018 B2
(45) Date of Patent: Apr. 23, 2024

(54) INFERRED SHADING

(71) Applicants: Andrew P. Mason, Cottesloe (AU); Olivier Soares, San Jose, CA (US); Haarm-Pieter Duiker, San Francisco, CA (US); John S. McCarten, Wellington (NZ)

(72) Inventors: Andrew P. Mason, Cottesloe (AU); Olivier Soares, San Jose, CA (US); Haarm-Pieter Duiker, San Francisco, CA (US); John S. McCarten, Wellington (NZ)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/129,158

(22) Filed: Dec. 21, 2020

(65) Prior Publication Data
US 2021/0192839 A1  Jun. 24, 2021

Related U.S. Application Data

(60) Provisional application No. 62/951,385, filed on Dec. 20, 2019.

(51) Int. Cl.
| | |
|---|---|
| G06T 15/50 | (2011.01) |
| G06T 7/507 | (2017.01) |
| G06T 7/529 | (2017.01) |
| G06T 13/40 | (2011.01) |
| G06T 15/04 | (2011.01) |

(Continued)

(52) U.S. Cl.
CPC ............. G06T 15/80 (2013.01); G06T 7/507 (2017.01); G06T 7/529 (2017.01); G06T 13/40 (2013.01); G06T 15/04 (2013.01); G06T 15/506 (2013.01); G06V 40/175 (2022.01); *G06T 2207/10012* (2013.01); *G06T 2207/20081* (2013.01); *G06T 2207/20084* (2013.01); *G06T 2207/30201* (2013.01)

(58) Field of Classification Search
CPC ....... G06T 15/04; G06T 15/50; G06T 15/506; G06T 13/40
See application file for complete search history.

(56) References Cited

U.S. PATENT DOCUMENTS

| | | |
|---|---|---|
| 6,608,624 B1 | 8/2003 | Wang |
| 10,181,213 B2 | 1/2019 | Bullivant |

(Continued)

OTHER PUBLICATIONS

Mandl, David, et al. "Learning lightprobes for mixed reality illumination." 2017 IEEE International Symposium on Mixed and Augmented Reality (ISMAR). IEEE, 2017. (Year: 2017).*

(Continued)

Primary Examiner — Ryan McCulley
(74) Attorney, Agent, or Firm — Blank Rome LLP

(57) ABSTRACT

Rendering an avatar in a selected environment may include determining as inputs into an inferred shading network, an expression geometry to be represented by an avatar, head pose, and camera angle, along with a lighting representation for the selected environment. The inferred shading network may then generate a texture of a face to be utilized in rendering the avatar. The lighting representation may be obtained as lighting latent variables which are obtained from an environment autoencoder trained on environment images with various lighting conditions.

17 Claims, 8 Drawing Sheets

(51) Int. Cl.
  *G06T 15/80*  (2011.01)
  *G06V 40/16*  (2022.01)

(56) References Cited

U.S. PATENT DOCUMENTS

| | | | |
|---|---|---|---|
| 10,467,803 B1* | 11/2019 | Degtyarev | ............ G06T 15/50 |
| 10,636,192 B1 | 4/2020 | Saragih | |
| 10,636,193 B1 | 4/2020 | Sheikh | |
| 10,796,476 B1 | 10/2020 | Xing | |
| 10,818,038 B2 | 10/2020 | Beeler | |
| 10,860,838 B1 | 12/2020 | Elahie | |
| 11,055,514 B1 | 7/2021 | Cao | |
| 11,120,600 B2 | 9/2021 | Stoyles | |
| 11,282,255 B2 | 3/2022 | Kuribayashi | |
| 11,303,850 B2 | 4/2022 | Tong | |
| 11,430,169 B2 | 8/2022 | Comer | |
| 2005/0008209 A1 | 1/2005 | Matsumoto | |
| 2010/0257214 A1 | 10/2010 | Bessette | |
| 2010/0333017 A1 | 12/2010 | Ortiz | |
| 2014/0035929 A1 | 2/2014 | Matthews | |
| 2015/0125049 A1 | 5/2015 | Taigman | |
| 2015/0193718 A1 | 7/2015 | Shaburov | |
| 2015/0242461 A1 | 8/2015 | Kung | |
| 2016/0042548 A1 | 2/2016 | Du | |
| 2016/0180568 A1 | 6/2016 | Bullivant | |
| 2016/0360970 A1 | 12/2016 | Tzvieli | |
| 2017/0069124 A1 | 3/2017 | Tong | |
| 2017/0193286 A1 | 7/2017 | Zhou | |
| 2018/0096511 A1 | 4/2018 | Beeler | |
| 2018/0157901 A1 | 6/2018 | Arbatman | |
| 2018/0308276 A1 | 10/2018 | Cohen | |
| 2018/0336714 A1 | 11/2018 | Stoyles | |
| 2018/0373925 A1 | 12/2018 | Wang | |
| 2019/0172242 A1 | 6/2019 | Bullivant | |
| 2019/0213772 A1* | 7/2019 | Lombardi | ............... G06T 13/40 |
| 2020/0082572 A1 | 3/2020 | Beeler | |
| 2020/0114925 A1 | 4/2020 | Iwasaki | |
| 2020/0202622 A1* | 6/2020 | Gallo | ............... G06T 15/10 |
| 2020/0219302 A1 | 7/2020 | Tarquini | |
| 2020/0349752 A1 | 11/2020 | Bullivant | |
| 2021/0256542 A1 | 8/2021 | McDaniel | |
| 2021/0390767 A1 | 12/2021 | Johnson | |

OTHER PUBLICATIONS

Weber, Henrique, Donald Prévost, and Jean-François Lalonde. "Learning to estimate indoor lighting from 3d objects." 2018 International Conference on 3D Vision (3DV). IEEE, 2018. (Year: 2018).*

Alotaibi, Sarah and William A. P. Smith, "A Biophysical 3D Morphable Model of Face Appearance," 2017 IEEE International Conference on Computer Vision Workshops (ICCVW), Oct. 22-29, 2017.

Chickerur, Satyadhyan and Kartik Joshi, "3D face model dataset: Automatic detection of facial expressions and emotions for educational environments," Aug. 13, 2015.

Costigan, et al., "Facial Retargeting using Neural Networks," MIG '14 Proceedings of the Seventh International Conference on Motion in Games, Playa Vista, California, Nov. 6-8, 2014.

Dubey, Monika and Prof. Lokesh Singh, "Automatic Emotion Recognition Using Facial Expression: A Review," vol. 3, Issue 2, Feb. 2016.

Garrido, et al., "Corrective 3D Reconstruction of Lips from Monocular Video," ACM Transactions on Graphics, vol. 35, Issue 6, Article 219 Nov. 2016.

Gotardo, "Practical Dynamic Facial Appearance Modeling and Acquisition," ACM Trans. Graph., vol. 37, No. 6, Article 232, Nov. 2018.

Hong, et al, "Real-Time Speech-Driven Face Animation with Expressions Using Neural Networks," IEEE Transactions on Neural Networks, vol. 13, No. 1, Jan. 2002.

Jimenez, et al., "A Practical Appearance Model for Dynamic Facial Color," ACM Transactions on Graphics, vol. 29(5), SIGGRAPH Asia 2010.

Karras, et al., "Audio-Driven Facial Animation by Joint End-to-End Learning of Pose and Emotion," ACM Transactions on Graphics, vol. 36, No. 4, Article 94, Jul. 2017.

Kingma, Diederik P. and Max Welling, "Auto-Encoding Variational Bayes," 2013, CoRR, abs/1312.6114.

Laine, et al., "Facial Performance Capture with Deep Neural Networks," Sep. 21, 2016.

Lombardi, et al., "Deep Appearance Models for Face Rendering," Aug. 1, 2018, arXiv:1808.00362v1.

Oyedotun, et al., "Facial Expression Recognition via Joint Deep Learning of RGB-Depth Map Latent Representations," IEEE International Conference on Computer Vision Workshops (ICCVW), Oct. 22-29, 2017.

Savran, et al., "Automatic Detection of Emotion Valence on Faces Using Consumer Depth Cameras," 2013 IEEE International Conference on Computer Vision Workshops, Dec. 2-8, 2013.

Thies, et al., "Deferred Neural Rendering: Image Synthesis using Neural Textures," Apr. 28, 2019, arXiv:1904.12356v1.

Tian, et al., "Recognizing Action Units for Facial Expression Analysis," IEEE Transactions on Pattern Analysis and Machine Intelligence, vol. 23, No. 2, Feb. 2001.

Videla, Lakshmi Sarvani, "Model Based Emotion Detection using Point Clouds," Aug. 3, 2015, Retrieved from the Internet: URL: https://www.slideshare.net/LakshmiSarvani1/model-based-emotion-detection-using-point-clouds [Retrieved on Aug. 9, 2018].

* cited by examiner

INFERRED SHADING

BACKGROUND

Computerized characters that represent and are controlled by users are commonly referred to as avatars. Avatars may take a wide variety of forms including virtual humans, animals, and plant life. Some computer products include avatars with facial expressions that are driven by a user's facial expressions. One use of facially-based avatars is in communication, where a camera and microphone in a first device transmits audio and real-time 2D or 3D avatar of a first user to one or more second users such as other mobile devices, desktop computers, videoconferencing systems and the like. Known existing systems tend to be computationally intensive, requiring high-performance general and graphics processors, and generally do not work well on mobile devices, such as smartphones or computing tablets. Further, existing avatar systems do not generally provide the ability to communicate nuanced facial representations or emotional states.

DETAILED DESCRIPTION

Figure 1:
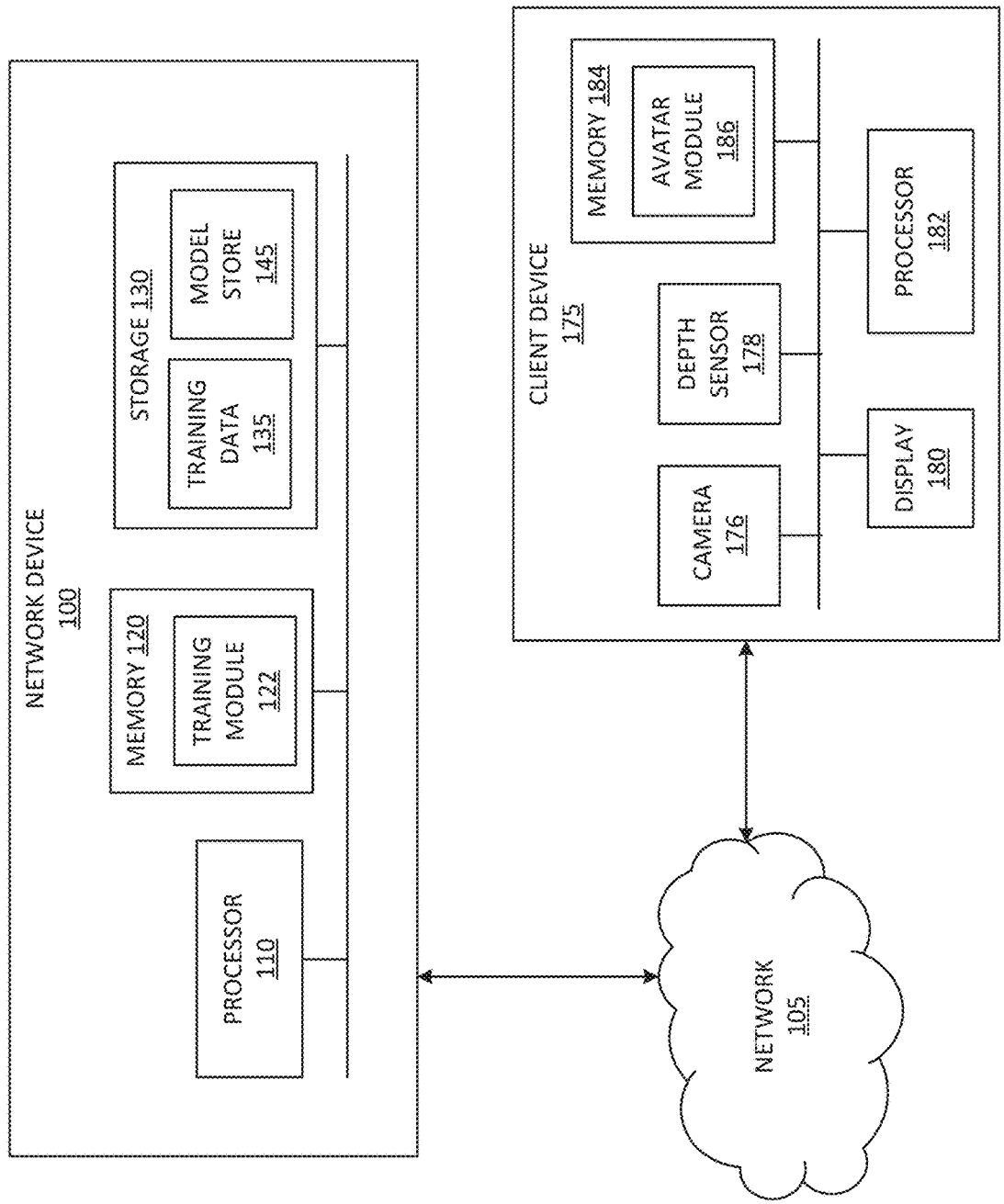
FIG. 1 shows, in block diagram form, a simplified system diagram according to one or more embodiments.

This disclosure relates generally to image processing. More particularly, but not by way of limitation, this disclosure relates to techniques and systems for generating and utilizing machine learning for rendering an avatar with improved shading.

This disclosure pertains to systems, methods, and computer readable media to utilize a machine learning based shading techniques for generating an avatar. To generate a photorealistic avatar, a texture on a face (or other virtual object) may be lit according to a particular environment, such as an environment selected by a user in which the avatar is to appear. In one or more embodiments, an inferred shading network may be trained to map lighting values, geometric expression model, head pose, and camera angle, to produce a texture that is lit according to an environment associated with the lighting values. In one or more embodiments, the lighting values may be obtained by training an autoencoder on images of various environments having various lighting variations, from which environmental latents representing lighting and color in a scene may be determined. The process may include a training phase and an application phase.

The first phase involves training an environment autoencoder based on environment image data, according to one or more embodiments. Many images of environments under various lighting are captured or otherwise generated such that ground truth data can be obtained between an environment and how lighting is distributed in the scene. In one or more embodiments, synthetic images may be used in which people or objects are lit under various conditions. As a result, the environment autoencoder may provide a lighting encoder which maps images of a scene to lighting latent variables. In one or more embodiments, the lighting encoder may be appended to a texture decoder which may be trained to utilize the lighting component, as well as expression latent variables (from a trained expression autoencoder based on a geometry of a user's face/head), and information regarding camera angle and head pose to generate a texture of a face under the particular lighting conditions. Similarly, the lighting encoder may be appended to a texture decoder trained to utilize the lighting component as well as object information such as object pose and/or camera angle in order to generate a texture of the object under the particular lighting conditions.

The second phase involves utilizing the trained networks to generate an avatar, or other virtual representation of an object. The avatar may be generated, for example, using a multipass rendering technique in which a lighted texture map is rendered as an additional pass during the multipass rendering process. As another example, the lighted texture for a particular expression and environment may be overlaid on a 3D mesh for a subject based on the lighted texture map. In embodiments in which a non-human object is utilized, a texture may be determined to overlay a model of the object.

For purposes of this disclosure, an autoencoder refers to a type of artificial neural network used to fit data in an unsupervised manner. The aim of an autoencoder is to learn a representation for a set of data in an optimized form. An autoencoder is designed to reproduce its input values as outputs, while passing through an information bottleneck that allows the dataset to be described by a set of latent variables. The set of latent variables are a condensed representation of the input content, from which the output content may be generated by the decoder. A trained autoencoder will have an encoder portion, a decoder portion, and the latent variables represent the optimized representation of the data.

For purposes of this disclosure, the term "avatar" refers to the virtual representation of a real-world subject, such as a person, animal, plant, object, and the like. The real-world subject may have a static shape, or may have a shape that changes in response to movement or stimuli.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed concepts. In the interest of clarity, not all features of an actual implementation may be described. Further, as part of this description, some of this disclosure's drawings may be provided in the form of flowcharts. The boxes in any particular flowchart may be presented in a particular order. It should be understood however that the particular sequence of any given flowchart is used only to exemplify one embodiment. In other embodiments, any of the various elements depicted in the flowchart may be deleted, or the illustrated sequence of operations may be performed in a different order, or even concurrently. In addition, other embodiments may include additional steps not depicted as part of the flowchart. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the disclosed subject matter, and multiple references to "one embodiment" or "an embodiment" should not be understood as necessarily all referring to the same embodiment.

It will be appreciated that in the development of any actual implementation (as in any software and/or hardware development project), numerous decisions must be made to achieve a developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design and implementation of graphics modeling systems having the benefit of this disclosure.

Referring to FIG. 1, a simplified block diagram of a network device 100 is depicted, communicably connected to a client device 175, in accordance with one or more embodiments of the disclosure. Client device 175 may be part of a multifunctional device, such as a mobile phone, tablet computer, personal digital assistant, portable music/video player, wearable device, base station, laptop computer, desktop computer, network device, or any other electronic device. Network device 100 may represent one or more server devices or other network computing devices within which the various functionality may be contained, or across which the various functionality may be distributed. Network device 100 may be connected to the client device 175 across a network 105. Illustrative networks include, but are not limited to, a local network such as a universal serial bus (USB) network, an organization's local area network, and a wide area network such as the Internet. According to one or more embodiments, network device 100 is utilized to train a model using environmental images to obtain an environmental model. Further, network device 100 may utilize the environmental model to generate a texture for an avatar that depicts the texture of the avatar in the lighting of a selected environment. Client device 175 is generally used to generate and/or present an avatar which is rendered in part based on the environmental lighting of a selected environment. It should be understood that the various components and functionality within network device 100 and client device 175 may be differently distributed across the devices, or may be distributed across additional devices.

Network Device 100 may include processor, such as a central processing unit (CPU), 110. Processor 110 may be a system-on-chip such as those found in mobile devices and include one or more dedicated graphics processing units (GPUs). Further processor 110 may include multiple processors of the same or different type. Network Device 100 may also include a memory 120. Memory 120 may each include one or more different types of memory, which may be used for performing device functions in conjunction with processor 110. For example, memory 120 may include cache, ROM, RAM, or any kind of transitory or non-transitory computer readable storage medium capable of storing computer readable code. Memory 120 may store various programming modules for execution by processor 110, including training module 122. Network device 100 may also include storage 130. Storage 130 may include one more non-transitory computer-readable mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 130 may include training data 135 and model store 145.

Client device 175 may be electronic devices with components similar to those described above with respect to network device 100. Client device 175, may include, for example, a memory 184 and processor 182. Client device 175 may also include one or more cameras 176 or other sensors, such as depth sensor 178, from which depth of a scene may be determined. In one or more embodiments, each of the one or more cameras 176 may be a traditional RGB camera, or a depth camera. Further, cameras 176 may include a stereo- or other multi-camera system, a time-of-flight camera system, or the like which capture images from which depth information of a scene may be determined. Client device 175 may allow a user to interact with computer-generated reality (CGR) environments. There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display device 180 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

According to one or more embodiments, training module 122 may train an expression model, such as an expression autoencoder neural network, based on image data from a single subject or multiple subjects. Further, training module 122 may train an environmental model, such as an environmental autoencoder, based on image data of environmental images of scenes with various lighting characteristics. As an example, network device may capture image data of a person or people presenting one or more facial expressions. In one or more embodiments, the image data may be in the form of still images, or video images, such as a series of frames. As a more specific example, the network device may capture ten minutes of data of someone with different facial expressions at 60 frames per second, although various frame rates and lengths of video may be used. According to one or more embodiments, a particular subject may be associated with an albedo map, which may be predetermined in a number of ways, and an expression decoder may be obtained, which may translate expression latent values into a geometric shape.

With respect to the environmental images, images may be utilized from various geographic locations and may include various lighting. In one or more embodiments, additional environmental training data may be generated by augmenting the environmental images, for example, for brightness and/or viewpoint. The environmental images may be, for example, images captured by a 360 degree camera. The environmental image data may be captured from a camera device that is part of the network device, or that is communicatively coupled to the network device. For example, image data may be received by the network device 100 from a distant source. The image data may be stored, for example, as training data 135 in network device 100.

Upon collecting the training data 135, the training module 122 may generate synthetic training data by rendering an image of the expressive face under known lighting conditions, and extracting the facial skin tone and texture of the face captured in each set of expression training data (e.g., the training data associated with a particular person). According to one or more embodiments, the training module 122 may extract the facial skin tone and texture in the form of a 2D texture map. From the texture map, the lighting information may be extracted. Each subject may be associated with an albedo map (e.g., the coloration of the subject's face under perfectly diffused light). The training module 122 may remove the albedo map (e.g., through subtraction or division). The result of the training may be a model that provides the texture maps. The model or models may be stored in model store 145.

In addition, the training module 122 may extract lighting information from the environmental training data. The lighting information may include, for example, coloration, lighting, shadows, and other characteristics related to the lighting in the scene. In one or more embodiments, the training module 122 may generate environment maps indicative of the lighting characteristics. Further, in one or more embodiments, the training module may utilize a lighting encoder obtained from the environmental model, and append it to a texture decoder associated with the expression model. The result is an inferred shading network which produces a lighting and expression dependent texture for an avatar.

Returning to client device 175, avatar module 186 renders an avatar, for example, depicting a user of client device 175 or a user of a device communicating with client device 175. In one or more embodiments, the avatar module 186 renders the avatar based on information such as head pose and camera angle, along with a latent representation of a geometry of the expression, and a latent representation of the lighting of a scene in which the avatar is to be rendered, and utilizes the values as input into the inferred shading network. According to one or more embodiments, the head pose, lighting condition, and view vector may be determined based on data obtained from camera 176, depth sensor 178, and/or other sensors that are part of client device 175. In one or more embodiments, the avatar module 186 may render the texture as an additional pass in a multipass rendering technique. In one or more embodiments, the inferred shading network may provide a texture that not only presents shadows and lit areas of the face, as would be present in the environment, but also includes the result of lighting hitting skin, such as scattering of the light under the skin that may occur, and the like, such as blood flow representation, or wrinkling representation for a given expression.

Although network device 100 is depicted as comprising the numerous components described above, in one or more embodiments, the various components may be distributed across multiple devices. Particularly, in one or more embodiments, one or more of the training module 122 and avatar module 186 may be distributed differently across the network device 100 and the client device 175, or the functionality of either of the training module 122 and avatar module 186 may be distributed across multiple modules, components, or devices, such as network devices. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2:
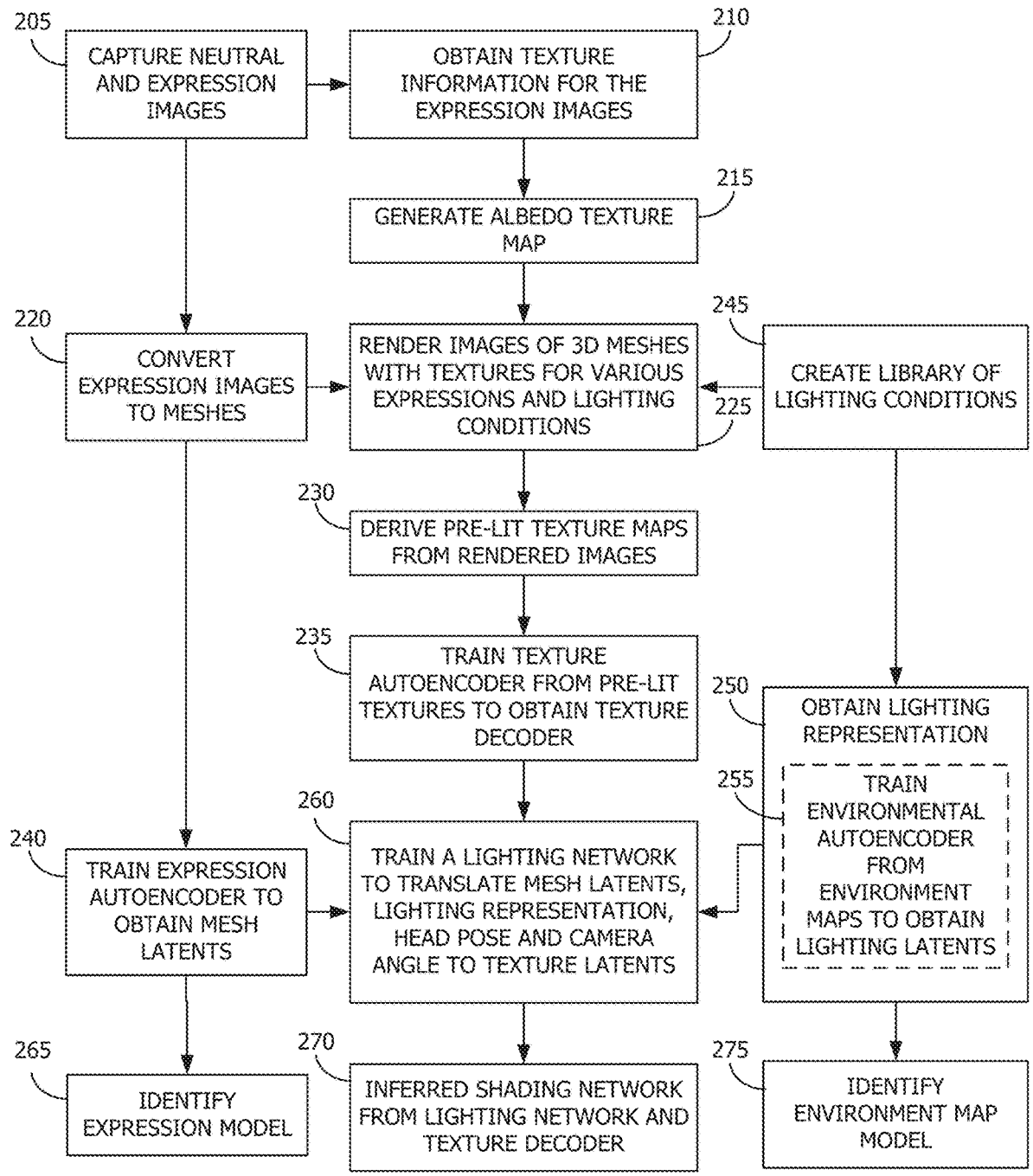
FIG. 2 shows a flowchart in which an inferred shading network is generated, according to one or more embodiments.

Referring to FIG. 2, a flow diagram is illustrated in which mesh and texture autoencoders are trained from a given sequence. Although the various process depicted in FIG. 2 are illustrated in a particular order, it should be understood that the various processes described may be performed in a different order. Further, not all of the various processes may be necessary to be performed to train the mesh and texture autoencoders, or obtain lighting representations.

According to one or more embodiments, the mesh and texture autoencoders may be trained from a series of images of one or more users in which the users are providing a particular expression or neutral image. As used here, the phrase "expression image" means an image of an individual having a non-neutral expression (e.g., happy, sad, excited, fearful, questioning, etc.). As such, the flowchart begins at 205, where the training module 122 captures or otherwise obtains expression images. In one or more embodiments, the expression images may be captured as a series of frames, such as a video, or may be captured from still images or the like. The expression images may be acquired from numerous individuals, or a single individual. By way of example, images may be obtained via a photogrammetry or stereophotogrammetry system, a laser scanner or an equivalent capture method.

The flowchart continues at 210 where the training module 122 obtains texture information for the expression images and neutral images. The texture information may be obtained by extracting a lighting component from an albedo map for the subject. An offset for the lighting may be calculated from the albedo texture map for the facial expression. As such, a texture for the expression image is obtained in relation to the albedo map.

At 215, the training module 122 generates a texture map, indicating the texture of the subject under perfect lighting. An albedo texture map may be generated for each subject for which expression images are obtained. The texture map may be a 2D map that indicates a coloration offset from the albedo texture for the subject. According to one or more embodiments, the neutral and expression images may be captured by a photogrammetry system or other controlled system in order to ensure even lighting over the face of the person or other subject.

Returning to block 205, one the neutral and expression images are captured, the flowchart also continues at 220, where the training module 122 converts the expression images to 3D meshes. The 3D mesh represents a geometric representation of the geometry of the subject's face when the subject is performing the expression, according to one or more embodiments.

According to one or more embodiments, a library of lighting conditions may be created at block 245. The training module 122 may obtain environmental images. The environmental images may have varied brightness and color. In one or more embodiments, the environmental images may be obtained from various geographic areas and may include various scenes. The environment images may be obtained, for example, a 360 degree camera, or otherwise may include a panoramic view of a scene. In one or more embodiments, additional environmental images may be generated for training data by augmenting the captured environmental images, for example to vary a view of the scene, or modify characteristics of the scene such as brightness or rotation. Lighting maps may be created from the images and used to create a library of lighting conditions.

The flowchart continues at 225 where the training module 122 renders images of 3D meshes with textures for various expressions and lighting conditions. In one or more embodiments, the images may be rendered by a rendering software which may take the 3D meshes and textures, and apply a lighting using point light sources, environment maps that indicate lighting in an environment, or the like, according to the created library of lighting conditions. Additionally, or alternatively, rendering the images may be performed in a multispectral lighting stage, in which each light may have its own color and intensity which may be individually controlled, and which may be included in the library of lighting conditions. For example, a controlled environment may be utilized in which the lighting on a subject is specifically controlled for intensity and direction, and images may be captured of a subject being lit under the known lighting conditions.

The flowchart continues at block 230 where pre-lit texture maps are derived from the rendered images. That is, in contrast to the albedo texture maps which indicate a texture of the subject under perfectly diffused lighting, the pre-lit texture maps indicate a texture of the subject under the particular lighting utilized in the rendering at block 225. As such, the texture map may be a 2D map that indicates a coloration offset from the albedo texture for the subject based on the particular lighting.

Then, at block 235, a texture autoencoder is trained from the blood flow texture and the albedo map. The texture autoencoder may be trained with the pre-lit texture maps from block 230 in order to reproduce the texture maps. In doing so, texture latents may be obtained based on the training. The texture latents may be representative values from a texture latent vector which provides a compressed representation of the blood flow map in vector form. Further, a texture decoder may be obtained in response to training the texture autoencoder. The texture decoder may be a network that takes in texture latents to reproduce the texture map.

Returning to block 220, once 3D meshes are obtained from the expression images, the flowchart may also continue to block 240, where the 3D mesh representation may be used to train an expression mesh autoencoder neural network. The expression mesh autoencoder may be trained to reproduce a given expression mesh. As part of the training process of the expression mesh autoencoder, mesh latents may be obtained as a compact representation of a unique mesh. The mesh latents may refer to latent vector values representative of the particular user expression in the image. Particularly, the mesh latent vector is a code that describes to a decoder how to deform a mesh to fit a particular subject geometry for a given expression. In one or more embodiments, the image to expression mesh neural network may be trained so that given an image, a latent vector may be estimated. The flowchart continues at 265, where the training module 122 identifies the expression model. According to one or more embodiments, the expression model may indicate a particular geometry of the user's face in an expressive state. Optionally, in or more embodiments, conditional variables may be applied to the expression model to further refine the model's output. Illustrative conditional variables include, for example, gender, age, body mass index, as well as emotional state. In one or more embodiments, the specific user's expression model may be stored for use during runtime.

This disclosure relates generally to image processing. More particularly, but not by way of limitation, this disclosure relates to techniques and systems for generating and utilizing machine learning for rendering an avatar with improved shading.

According to one or more embodiments, a library of lighting conditions may be created at block 245. In some embodiments, the library of lighting conditions may be provided from a network device. The library of lighting conditions may include lighting having various characteristics, such as direction, brightness, and the like. The flowchart also includes, at 250, obtaining a lighting representation. The lighting representation may be determined for the various lighting maps from the library of lighting conditions created at block 245. The lighting of a particular environment may be represented in any kind of compressed representation of lighting. Examples include spherical harmonic coefficients, spherical gaussian coefficients, spherical wavelets, or lighting latents derived from a trained autoencoder. In one or more embodiments, at block 255, an environment autoencoder may be trained to recreate lighting in an image, such as the lighting in the library of lighting conditions. As a result, latent variables representing lighting conditions, such as brightness and color, may be identified.

The flowchart continues at block 260 where a lighting network is trained to translate the mesh latents from block 240, the lighting representation from block 250, and other information such as head pose and camera angle, to texture latents. According to one or more embodiments, the latents from the mesh expression autoencoder are used as inputs to a small network that learns to output texture latents for the texture decoder. The texture latents may be determined because each image has a known expression from which mesh latents may be obtained, and a known lighting, from which the lighting representation is obtained. Head pose and camera angle may also be used to determine a particular view of a subject and a particular spatial relationship of the subject to the environmental lighting.

At 270, the training module 122 effectively links the lighting encoder from block 260 to the texture decoder from block 235. In one or more embodiments, the texture decoder may be utilized as a dynamic texture model, such that the texture model can estimate texture based on mesh latent inputs, lighting latents, and in some embodiments, other characteristics such as head pose and camera angle.

Figure 3:
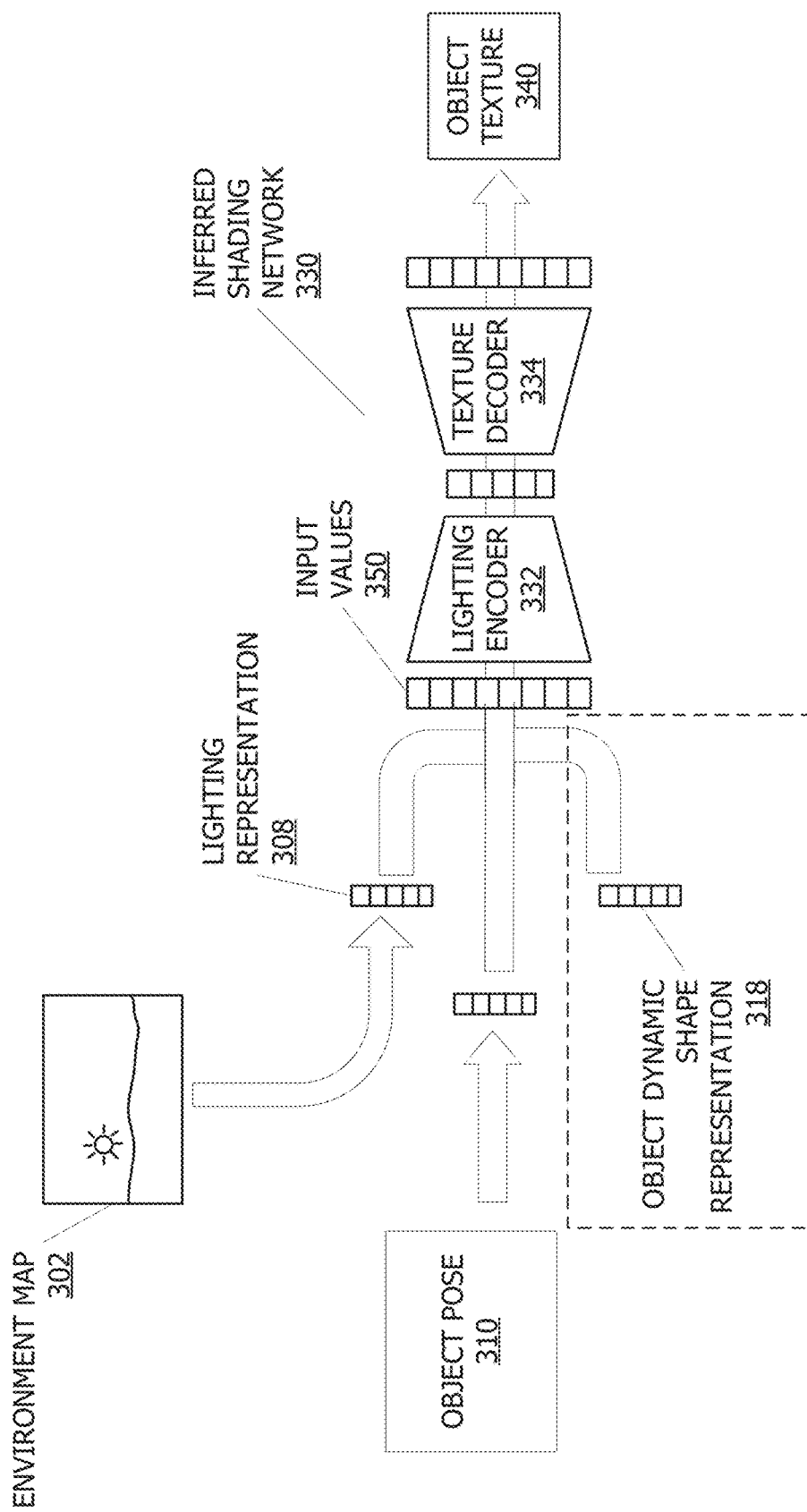
FIG. 3 shows a training operation for an inferred shading network using a lighting representation, according to one or more embodiments.

Referring to FIG. 3, a flowchart is depicted in which an inferred shading network is trained to provide a texture for a lit object, according to one or more embodiments. The example flow is presented merely for description purposes. In one or more embodiments, not all components detailed may be necessary, and in one or more embodiments additional or alternative components may be utilized.

At 302, an environment map is received corresponding to an environment in which a particular object is to be displayed. The environment map may be associated with a scene with a particular lighting. The lighting of the environment map 302 may be represented by lighting representation 308. Lighting representation 308 may represent brightness, color, and/or other characteristics related to lighting in a scene, and may be any kind of compact digital representation of lighting of an environment. As an example, the lighting representation 308 may be in the form of spherical harmonics or spherical gaussians. As another example, as will be described in greater detail with respect to FIG. 4, the lighting representation may include lighting latent variables obtained from a trained environment autoencoder.

In one or more embodiments, the lighting representation 308 is input into a lighting encoder 322 along with a representation of an object pose 310. The object pose 310 may correspond to an object for which the inferred shading network 330 is trained. The pose may be represented as a set of six values, representing translation and rotation values, or may be any other representation of a pose. According to one or more embodiments, the object may be a rigid or non-rigid object. In the case of a rigid object, the geometry of the rigid object may be "baked into" the inferred shading network, or disregarded by the inferred shading network, since the shape will not change, and the texture can simply be overlaid onto a known geometry of the object. Alternatively, or additionally, the object pose representation 310 may indicate a geometric shape of the object.

In the case of a non-rigid object, the geometry of the object may be included as the object dynamic shape representation 318. The object dynamic shape representation 318 may include a representation of the geometry of the object which may change. In one or more embodiments, the shape representation may be presented in the form of latent variables obtained from training an autoencoder on various shapes of the object. As another example, the object dynamic shape representation may be another compact digital representation of a geometry of the object.

The lighting representation 308, the object pose 310 and, optionally, the object dynamic shape representation 318 may be combined as input values 350 to the lighting encoder 332. In one or more embodiments, the various inputs may be weighted or calibrated against each other. As an example, the lighting representation 308 may be comprised of 33 values, whereas the object pose may be 6 values. The combined values may be normalized in order to prevent over-representation or under-representation of the various values. In one or more embodiments, batch normalization may be utilized to adjust or condense the various values of input values 350.

The inferred shading network 330 may include a lighting encoder 332 appended to a texture decoder 334 which is trained to read in the input values 350 to produce an object texture 340. The lighting encoder 332 may translate the input values 350 to texture latents, from which the texture decoder 334 can render the object texture 340. According to one or more embodiments, the object texture 340 may then be overlaid onto a 3D geometric representation of the object to generate a virtual object which may be placed in an environment represented by environment map 302 in such a way that the virtual object appears lit by the lighting of the environment map 302.

Figure 4:
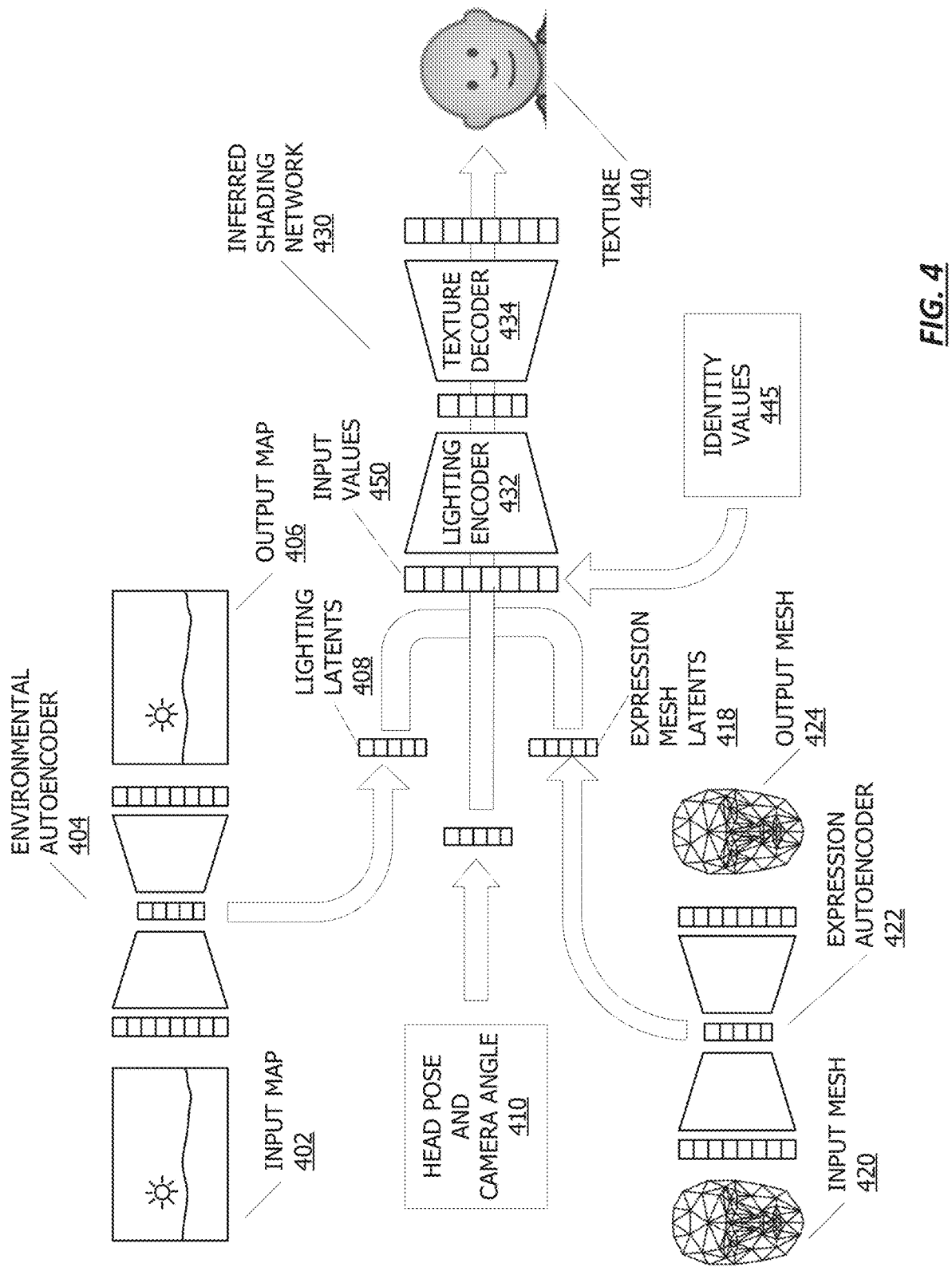
FIG. 4 shows an inferred shading network training technique using an environmental autoencoder, according to one or more embodiments.

Referring to FIG. 4, a flowchart is depicted in which an inferred shading network is trained to provide a mapping between an expression of a user and environment, and a lighted texture for the user, according to one or more embodiments. The example flow is presented merely for description purposes. In one or more embodiments, not all components detailed may be necessary, and in one or more embodiments additional or alternative components may be utilized.

The flow diagram begins when an environmental autoencoder 404 is trained to compress and recreate images of an environment. As such, environmental autoencoder 404 takes in input environment map 402 and recreates output environment map 406. One of the byproducts of the trained autoencoder is that the compressed version of the environment map 402 includes lighting latents 408 which include a set of values which represent the lighting of the input environment map 402. For example, the lighting latents 408 may represent brightness, color, and/or other characteristics related to lighting in a scene.

The flowchart also includes an expression autoencoder 422 which takes in an input mesh 420 representing facial expressions presented in the series of frames. In one or more embodiments, the facial expressions may be determined by obtaining latent variables associated with the facial geometry. As an example, an expression neural network model may be used which maps expressive image data to a 3D geometry of a representation of the expression. In one or more embodiments, the expression autoencoder 422 may be trained to recreate given 3D meshes of expressions. In one or more embodiments, the autoencoder "compresses" the variables in the 3D geometry to a smaller number of expression mesh latents 418 which may represent a geometric offset from a user's neutral face or otherwise represent a geometric representation of a face for a given expression.

In one or more embodiments, the lighting representation 308 is input into a lighting encoder 322 along with a representation of a head pose and camera angle 410. The head pose and camera angle 410 may each be represented, for example, as a set of six values, representing translation and rotation values, or may be any other representation of a head pose and camera angle, such as a combined representation.

According to one or more embodiments, the inferred shading network 430 may be trained for a unique individual, or may be trained to handle multiple people. In the situation where the inferred shading network 430 is trained to handle multiple people, identity values 445 may be obtained which uniquely identify a person for which the avatar is to be created. As an example, returning to FIG. 2, the lighting network may be trained on expression images from multiple people, according to one or more embodiments. The identity values 445 may indicate a uniqueness of an individual, such as how a particular expression uniquely affects a texture of the face, or other characteristics of the face.

The lighting latents 408, the head pose and camera angle 410, the expression mesh latents 418 and, optionally, the identity values 445 may be combined as input values 450 to the lighting encoder 432. In one or more embodiments, the various inputs may be weighted or calibrated against each other. As an example, the lighting representation 408 may be comprised of 33 values, whereas the object pose may be 12 values, and the expression mesh latents may be an additional 28 values. The combined values may be normalized in order to prevent over-representation or under-representation of the various values. In one or more embodiments, batch normalization may be utilized to adjust or condense the various values of input values 450.

The inferred shading network 430 may include a lighting encoder 432 appended to a texture decoder 434 which is trained to read in the input values 450, and may a texture 440, which represents the user, lit appropriate to the environment from which the lighting latents were generated. The texture 440 may then be applied to the 3D mesh and the resulting avatar may be displayed in the environment represented by the input environment map 402 and appear as if it was lit by the lighting in the environment represented by the environment map 402.

The flowchart of FIG. 4 is shown as an alternate example to the flowchart of FIG. 3. However, it should be understood that the various components may be differently arranged between FIG. 3 and FIG. 4. As an example, the lighting representation 408 may be replaced by another kind of lighting representation, such as those described above with respect to lighting representation 308 of FIG. 3. As another example, the expression mesh latents 418 may alternatively be replaced by another compact representation of geometry of an expression that does not utilize an expression autoencoder, such as the object dynamic shape representation 318 of FIG. 3.

Figure 5:
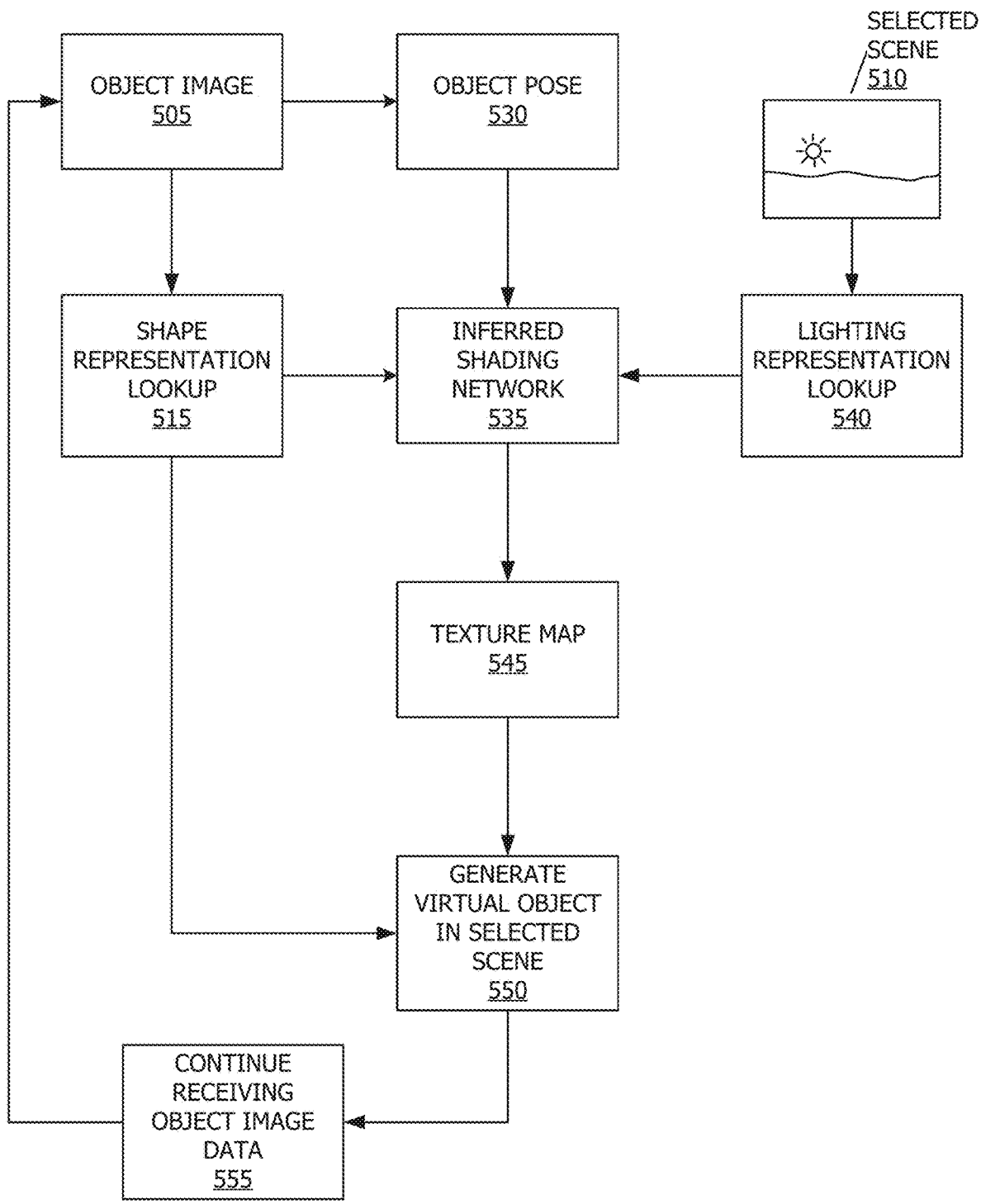
FIG. 5 shows a flow diagram illustrating virtual object generation, in accordance with one or more embodiments.

Referring to FIG. 5, a flow chart is depicted in which a virtual object is rendered utilizing an inferred shading network 535. According to one or more embodiments, the virtual object may be rendered by avatar module 186 of client device 175. The virtual object may be rendered on the fly, and may be rendered, for example, as part of a gaming environment, a mixed reality application, and the like.

The flowchart begins at 505, in which an object pose to be represented by a virtual object is determined from an object image. Upon receiving the object image, the avatar module 186 performs a shape representation lookup at 515. The shape representation lookup may be obtained from a known geometric representation of the shape in the case where the object is a rigid object, such as a 3D mesh. Further, the shape representation may be determined dynamically, as is the case with the object dynamic shape representation described above with respect to FIG. 3 to represent how the shape is deformed at a particular time.

At 530, the avatar module 186 determines a pose of the object. According to one or more embodiment, the pose may be obtained based on data received sensors on the client device 175, such as camera 176 or depth sensor 178, or other sensors that are part of or communicably coupled to client device 175. The object pose may be represented in a variety of ways, such as translation and rotation values or other compact numeric representation of the object pose.

In addition, at 510, a scene is selected, or determined to be selected, in which the virtual object is to be rendered. For example, the selected scene may be an environment different from an environment in which the object is currently present. The selected scene may be selected from the library of lighting conditions described above with respect to FIG. 2. In one or more embodiments, the selected scene may be selected by the user through a user interface in which the user may identify an environment in which the virtual object should be presented.

A lighting representation lookup 540 may be performed for the requested scene. The lighting representation may be represented in a variety of ways. In one or more embodiments, the lighting in the environment may be represented using spherical harmonics, spherical gaussians, spherical wavelets, and the like. According to one or more embodiments, the lighting representation may be obtained from a trained environment autoencoder which produces lighting latents in the process of reproducing a given environment map. The lighting representation may be obtained, for example, from an HDR environment map. The lighting representation may be represented in the form of a vector of RGB values that represent a current lighting in the environment.

The inferred shading network 535 may then utilize the object pose, shape representation, and lighting representation, to generate a texture map 545. In one or more embodiments, the texture map 545 may refer to a flattened texture which may represent a texture of the object in object image 505 in the particular selected scene 510 based on the lighting within the scene 510. In one or more embodiments, the texture map may be a 2D texture map which may be overlaid over a mesh representation or other 3D representation of the object presented in the object image.

The flow chart continues at 550 where the avatar module 186 renders the virtual object utilizing the texture map, along with the shape representation and the determined object pose. The virtual object may be rendered in a number of ways. As an example, the 2D texture map may be rendered as an additional pass in a multipass rendering technique. As another example, the virtual object may be rendered with the texture map comprised in the lighting data that is rendered for the virtual object.

Because the virtual object is generated in real time, it may be based on image data of the object, or a dynamic environment. As such, the flowchart continues at 555 where the avatar module 186 continues to receive object image data. Then the flowchart repeats at 505 while new image data is continuously received.

Figure 6:
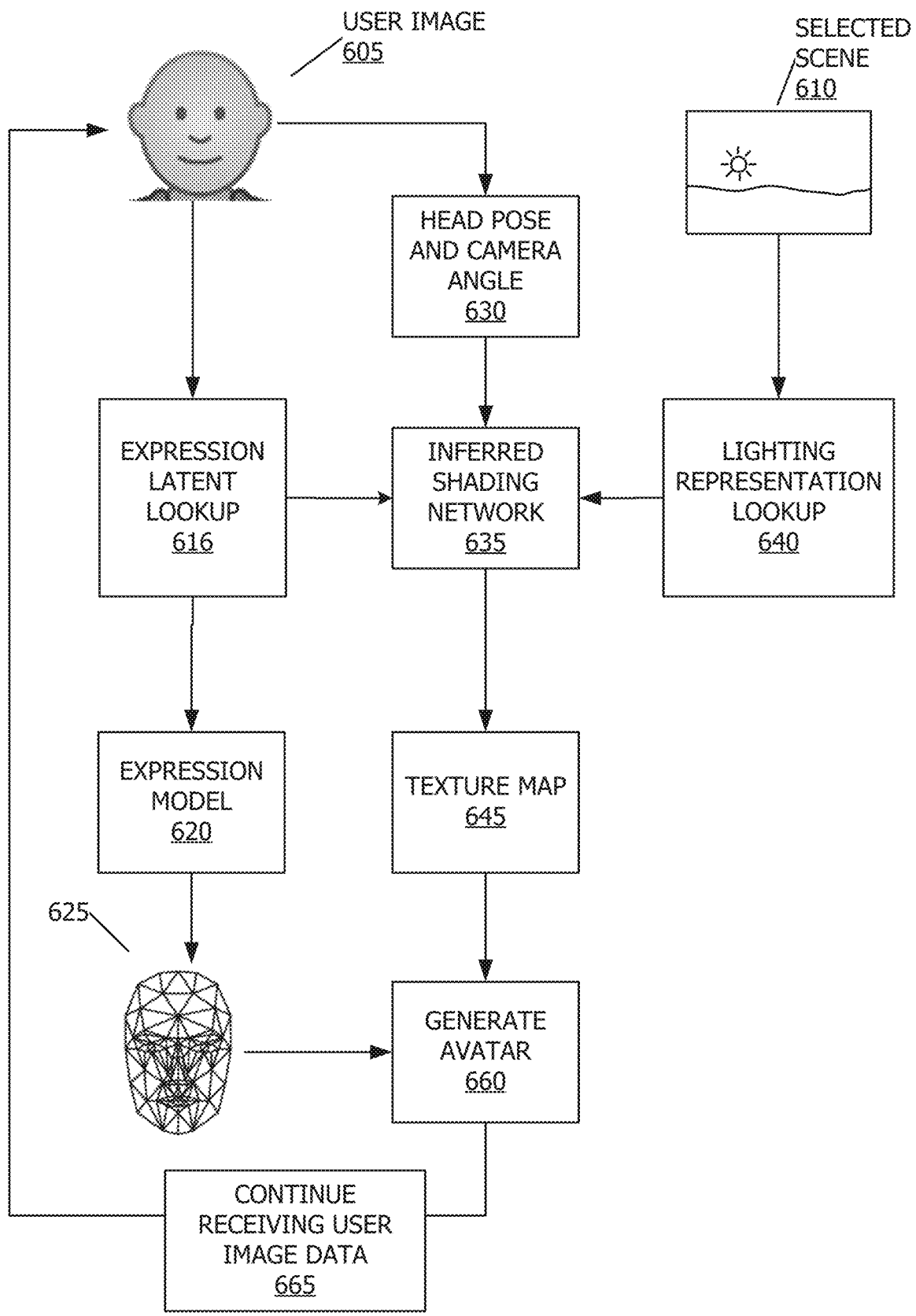
FIG. 6 shows a flow diagram illustrating avatar generation, in accordance with one or more additional embodiments.

Referring to FIG. 6, a flow chart is depicted in which an avatar for a person is rendered utilizing an inferred shading network 635. According to one or more embodiments, the avatar may be rendered by avatar module 186 of client device 175. The avatar may be rendered on the fly, and may be rendered, for example, as part of a gaming environment, a mixed reality application, and the like.

The flowchart begins at 605, in which an expression to be represented by an avatar is determined from a user image. Upon receiving the user image, the avatar module 186 performs an expression latent vector lookup at 615. The expression latent vector may be obtained from an expression model which maps image data to 3D geometric information for a mesh representing the user in the image data. As described above, the expression latents may represent the offset from the geometric information for a neutral expression, and may be determined from an expression autoencoder which has been trained to reproduce 3D mesh representations of expressions. An expression model 620 may then be utilized to determine a mesh representation 625 of the user performing the expression based on the expression latents.

At 630, the avatar module 186 determines a head pose and camera angle (for example a view vector) in determining an expression to be represented by the avatar. According to one or more embodiment, the head pose may be obtained based on data received sensors on the client device 175, such as camera 176 or depth sensor 178, or other sensors that are part of or communicably coupled to client device 175.

At 610, a scene is selected in which the avatar is to be rendered. For example, the selected scene may be an environment different from an environment in which the user is currently present in the user image 605. In one or more embodiments, the selected scene may be selected by the user through a user interface in which the user may identify an environment in which the avatar should be presented.

The flowchart continues at 640 where a lighting representation lookup 640 occurs. In one or more embodiments, the lighting in the environment may be represented using spherical harmonics, spherical gaussians, spherical wavelets, and the like. According to one or more embodiments, the lighting representation may be obtained from a trained environment autoencoder which produces lighting latents in the process of reproducing a given environment map. The lighting representation may be obtained, for example, from an HDR environment map. The lighting representation may be represented in the form of a vector of RGB values that represent a current lighting in the environment.

The inferred shading network 635 may then utilize the expression latents, lighting representation, and data regarding head pose and camera angle, and generates a texture map 645. In one or more embodiments, the texture map 645 may refer to a flattened texture which may represent a texture of the user's face performing the particular expression from the user image 605 in the particular selected scene 610 based on the lighting within the scene 610.

The flow chart continues at 660 where the avatar module 186 renders the avatar utilizing the texture map. The avatar may be rendered in a number of ways. As an example, the texture map may be a 2D texture map which may be overlaid over a mesh representative of the subject presenting the particular expression. The 2D texture map may be rendered as an additional pass in a multipass rendering technique. As another example, the avatar may be rendered with the texture map comprised in the lighting data that is rendered for the avatar.

Because the virtual object is generated in real time, it may be based on image data of the object, or a dynamic environment. As such, the flowchart continues at 665 where the avatar module 186 continues to receive object image data. Then the flowchart repeats at 605 while new image data is continuously received.

In some embodiments, multiple client devices may be interacting with each other in a communication session. Each client device may generate avatars representing users of the other client devices. A recipient device may receive, for example, the environment map and/or the texture map only once, or a limited number of times. The recipient device may receive the maps as a transmission from a sending client device or may acquire them from a network source. The maps may be associated with a user of the sending client device, for example. During the communication session, the sending device may only need to transmit the latent vector representing the expression in order for the recipient device to generate an avatar of the user of the sending device. As such, lighting information and texture information are not transmitted as a stream of textures during the communication session. Rather, the compact representation of the expression in the form of the expression latents is transmitted during the communication session to allow a recipient device to render the avatar.

Figure 7:
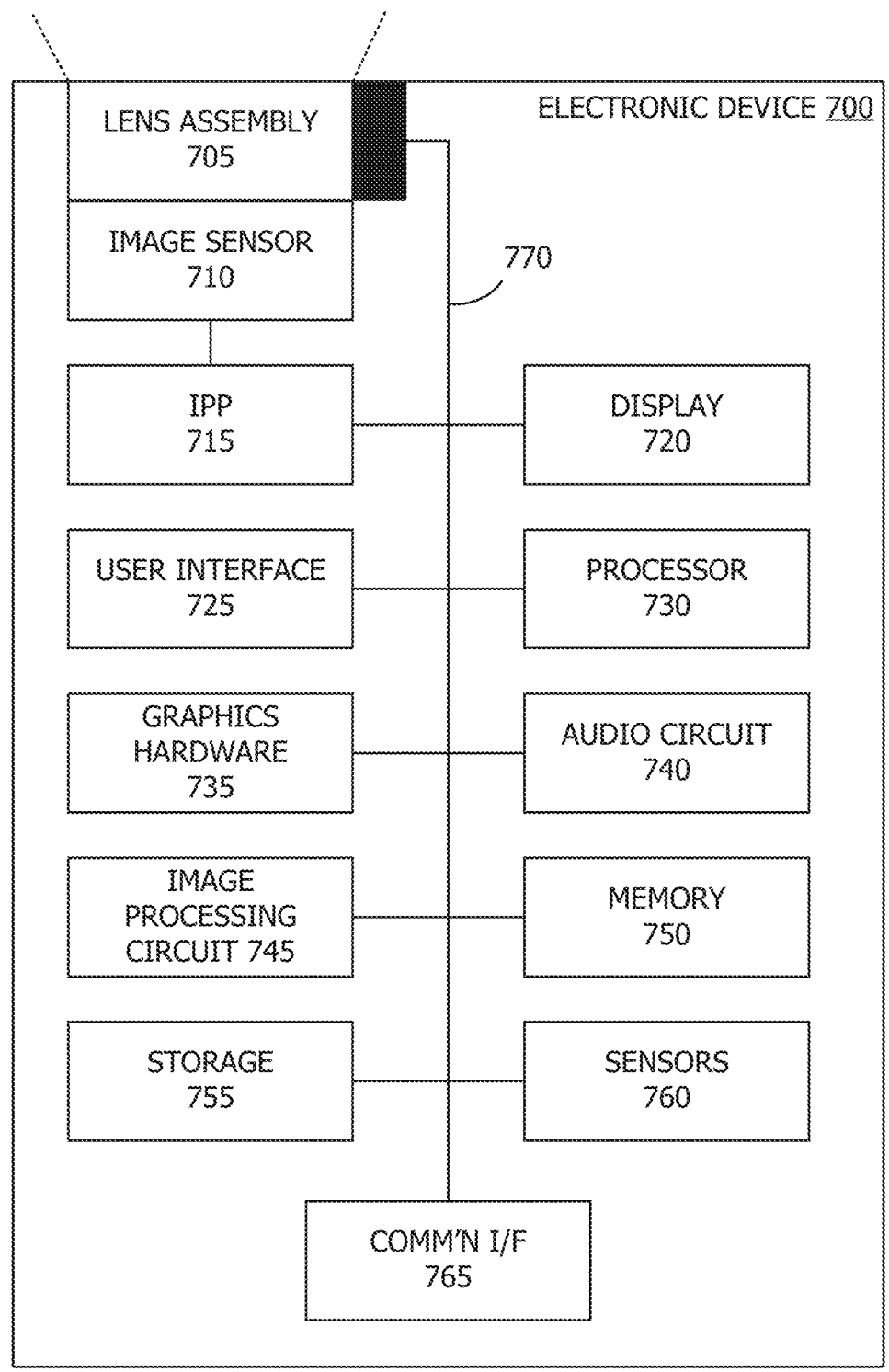
FIG. 7 shows, in block diagram form, a multi-function electronic device in accordance with one or more embodiments.

Referring to FIG. 7, a simplified functional block diagram of illustrative electronic device 700 is shown according to one or more embodiments. Electronic device 700 may be used to acquire user images (e.g., a temporal sequence of image frames) and generate and animate an avatar in accordance with this disclosure. As noted above, illustrative electronic device 700 could be a mobile telephone (aka, a smart-phone), a personal media device or a notebook computer system. As shown, electronic device 700 may include lens assemblies 705 and image sensors 710 for capturing images of a scene (e.g., a user's face), and/or information about a scene (e.g., a depth sensor). By way of example, lens assembly 705 may include a first assembly configured to capture images in a direction away from the device's display 720 (e.g., a rear-facing lens assembly) and a second lens assembly configured to capture images in a direction toward or congruent with the device's display 720 (e.g., a front facing lens assembly). In one embodiment, each lens assembly may have its own sensor (e.g., element 710). In another embodiment, each lens assembly may share a common sensor. In addition, electronic device 700 may include image processing pipeline (IPP) 715, display element 720, user interface 725, processor(s) 730, graphics hardware 735, audio circuit 740, image processing circuit 745, memory 750, storage 755, sensors 760, communication interface 765, and communication network or fabric 770.

Lens assembly 705 may include a single lens or multiple lens, filters, and a physical housing unit (e.g., a barrel). One function of lens assembly 705 is to focus light from a scene onto image sensor 710. Image sensor 710 may, for example, be a CCD (charge-coupled device) or CMOS (complementary metal-oxide semiconductor) imager. IPP 715 may process image sensor output (e.g., RAW image data from sensor 710) to yield an HDR, image sequence or video sequence. More specifically, IPP 715 may perform a number of different tasks including, but not be limited to, black level removal, de-noising, lens shading correction, white balance adjustment, demosaic operations, and the application of local or global tone curves or maps. IPP 715 may comprise a custom designed integrated circuit, a programmable gate-array, a central processing unit (CPU), a graphical processing unit (GPU), memory, or a combination of these elements (including more than one of any given element). Some functions provided by IPP 715 may be implemented at least in part via software (including firmware). Display element 720 may be used to display text and graphic output as well as receiving user input via user interface 725. In one embodiment, display element 720 may be used to display the avatar of an individual communicating with the user of device 700. Display element 720 may also be a touch-sensitive display screen. User interface 725 can also take a variety of other forms such as a button, keypad, dial, a click wheel, and keyboard. Processor 730 may be a system-on-chip (SOC) such as those found in mobile devices and include one or more dedicated CPUs and one or more GPUs. Processor 730 may be based on reduced instruction-set computer (RISC) or complex instruction-set computer (CISC) architectures or any other suitable architecture and each computing unit may include one or more processing cores. Graphics hardware 735 may be special purpose computational hardware for processing graphics and/or assisting processor 730 perform computational tasks. In one embodiment, graphics hardware 735 may include one or more programmable GPUs each of which may have one or more cores. Audio circuit 740 may include one or more microphones, one or more speakers and one or more audio codecs. Image processing circuit 745 may aid in the capture of still and video images from image sensor 710 and include at least one video codec. Image processing circuit 745 may work in concert with IPP 715, processor 730 and/or graphics hardware 735. Images, once captured, may be stored in memory 750 and/or storage 755. Memory 750 may include one or more different types of media used by IPP 715, processor 730, graphics hardware 735, audio circuit 740, and image processing circuitry 745 to perform device functions. For example, memory 750 may include memory cache, read-only memory (ROM), and/or random access memory (RAM). Storage 755 may store media (e.g., audio, image and video files), computer program instructions or software, preference information, device profile information, pre-generated models, frameworks, and any other suitable data. When executed by processor module 730 and/or graphics hardware 735 such computer program code may implement one or more of the methods described herein. Storage 755 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Device sensors 760 may include, but need not be limited to, one or more of an optical activity sensor, an optical sensor array, an accelerometer, a sound sensor, a barometric sensor, a proximity sensor, an ambient light sensor, a vibration sensor, a gyroscopic sensor, a compass, a magnetometer, a thermistor sensor, an electrostatic sensor, a temperature sensor, and an opacity sensor. Communication interface 765 may be used to connect device 700 to one or more networks. Illustrative networks include, but are not limited to, a local network such as a universal serial bus (USB) network, an organization's local area network, and a wide area network such as the Internet. Communication interface 765 may use any suitable technology (e.g., wired or wireless) and protocol (e.g., Transmission Control Protocol (TCP), Internet Protocol (IP), User Datagram Protocol (UDP), Internet Control Message Protocol (ICMP), Hypertext Transfer Protocol (HTTP), Post Office Protocol (POP), File Transfer Protocol (FTP), and Internet Message Access Protocol (IMAP)). Communication network or fabric 770 may be comprised of one or more continuous (as shown) or discontinuous communication links and be formed as a bus network, a communication network, or a fabric comprised of one or more switching devices (e.g., a cross-bar switch).

Figure 8:
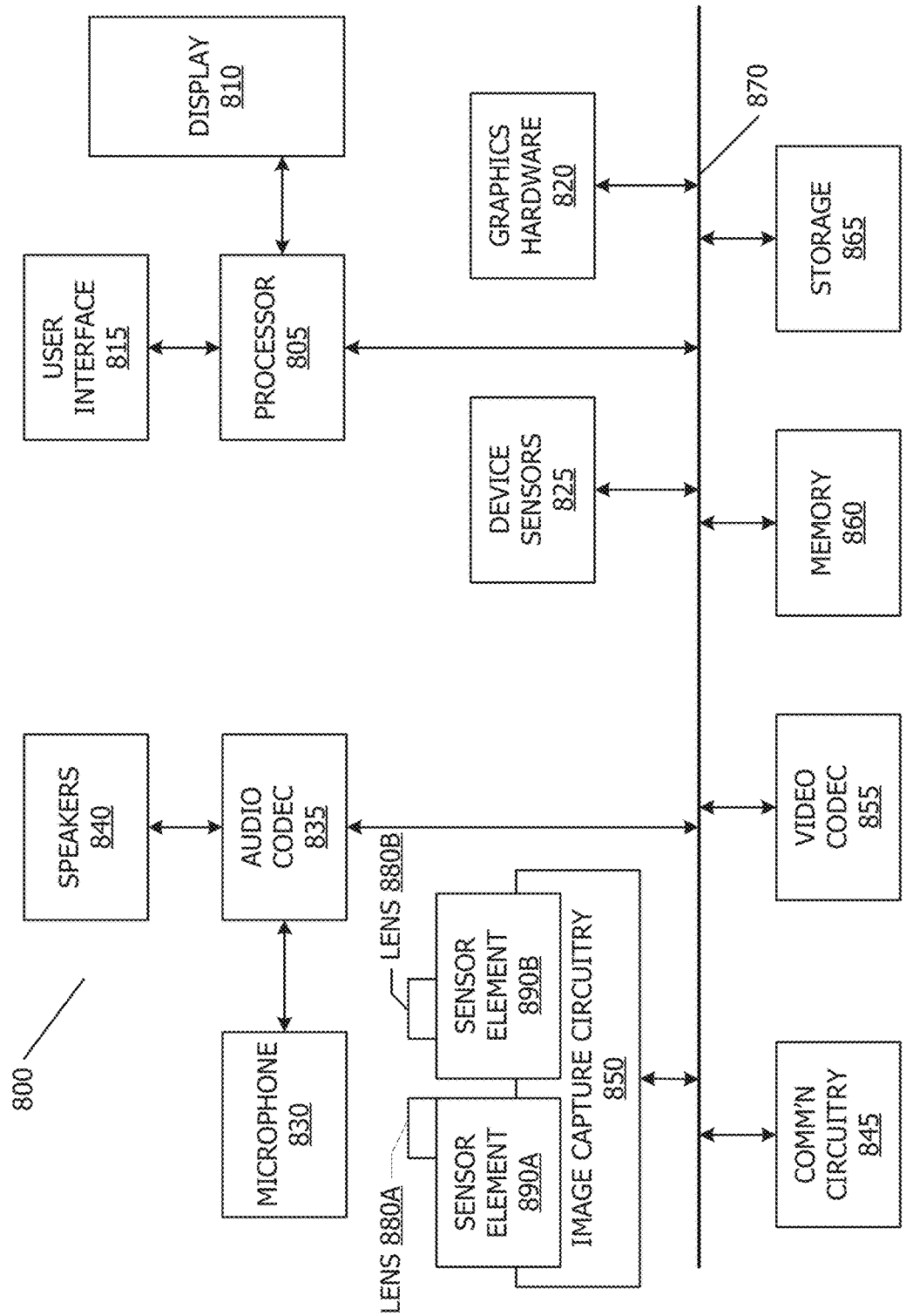
FIG. 8 shows, in block diagram form, a computer system in accordance with one or more embodiments.

Referring now to FIG. 8, a simplified functional block diagram of illustrative multifunction electronic device 800 is shown according to one embodiment. Each of electronic devices may be a multifunctional electronic device, or may have some or all of the described components of a multifunctional electronic device described herein. Multifunction electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture circuitry 850 (e.g., including camera system) video codec(s) 855 (e.g., in support of digital image capture unit), memory 860, storage device 865, and communications bus 870. Multifunction electronic device 800 may be, for example, a digital camera or a personal electronic device such as a personal digital assistant (PDA), personal music player, mobile telephone, or a tablet computer.

Processor 805 may execute instructions necessary to carry out or control the operation of many functions performed by device 800 (e.g., such as the generation and/or processing of images as disclosed herein). Processor 805 may, for instance, drive display 810 and receive user input from user interface 815. User interface 815 may allow a user to interact with device 800. For example, user interface 815 can take a variety of forms, such as a button, keypad, dial, a click wheel, keyboard, display screen and/or a touch screen. Processor 805 may also, for example, be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable GPU.

Image capture circuitry 850 may include two (or more) lens assemblies 880A and 880B, where each lens assembly may have a separate focal length. For example, lens assembly 880A may have a short focal length relative to the focal length of lens assembly 880B. Each lens assembly may have a separate associated sensor element 890. Alternatively, two or more lens assemblies may share a common sensor element. Image capture circuitry 850 may capture still and/or video images. Output from image capture circuitry 850 may be processed, at least in part, by video codec(s) 855 and/or processor 805 and/or graphics hardware 820, and/or a dedicated image processing unit or pipeline incorporated within image capture circuitry 850. Images so captured may be stored in memory 860 and/or storage 865.

Image capture circuitry 850 may capture still and video images that may be processed in accordance with this disclosure, at least in part, by video codec(s) 855 and/or processor 805 and/or graphics hardware 820, and/or a dedicated image processing unit incorporated within image capture circuitry 850. Images so captured may be stored in memory 860 and/or storage 865. Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805 such computer program code may implement one or more of the methods described herein.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

As described above, one aspect of the present technology is the gathering and use of data available from various sources to estimate emotion from an image of a face. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to train expression models. Accordingly, use of such personal information data enables users to estimate emotion from an image of a face. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIP4); whereas health data in other countries may be subject to other regulations and policies and should be handled accordingly. Hence different privacy practices should be maintained for different personal data types in each country.

It is to be understood that the above description is intended to be illustrative, and not restrictive. The material has been presented to enable any person skilled in the art to make and use the disclosed subject matter as claimed and is provided in the context of particular embodiments, variations of which will be readily apparent to those skilled in the art (e.g., some of the disclosed embodiments may be used in combination with each other). Accordingly, the specific arrangement of steps or actions or the arrangement of elements shown should not be construed as limiting the scope of the disclosed subject matter. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable instructions executable by one or more processors to:
    receive lighting latents for an environment in which an avatar of a subject is to be displayed
    wherein the subject is in a separate environment having different lighting than the environment in which the avatar is to be displayed;
    determine mesh latents for the subject;
    apply the lighting latents and the mesh latents to an inferred shading network comprising a lighting encoder and a texture decoder,
    wherein the lighting encoder generates a set of texture latents based on the lighting latents and mesh latents, and
    wherein the texture decoder generates a texture map representing a texture of a face of the subject in the lighting of the environment based on the set of texture latents provided by the lighting encoder; and
    render an avatar of the subject in a view of the environment based on the texture map and a geometric representation of the subject.

2. The non-transitory computer readable medium of claim 1, wherein the lighting encoder translates the lighting latents to the set of texture latents, and wherein the texture decoder generates the texture map from the set of texture latents.

3. The non-transitory computer readable medium of claim 1 further comprising computer readable code to:
    obtain a plurality of environment map images; and
    train an environmental autoencoder based on the environment map images,
    wherein the lighting latents are representative of a lighting of an image of an input scene into the trained environmental autoencoder.

4. The non-transitory computer readable medium of claim 1, wherein the computer readable code for rendering the avatar further comprises computer readable code to:
    obtain a mesh representation of the subject; and
    apply the texture map to the mesh representation.

5. The non-transitory computer readable medium of claim 1, wherein the lighting latents comprises a compressed representation of color in the environment.

6. The non-transitory computer readable medium of claim 1, wherein the lighting latents comprises at least one selected from a group consisting of spherical harmonic coefficients, spherical gaussians, and spherical wavelets for the environment.

7. A system for generating an avatar, comprising:
    one or more processors; and
    a non-transitory computer readable medium comprising computer readable instructions executable by the one or more processors to:

receive lighting latents for an environment in which an avatar of a subject is to be displayed, wherein the subject is in a separate environment having different lighting than the environment in which the avatar is to be displayed;

determine mesh latents for the subject;

apply the lighting latents and the mesh latents to an inferred shading network comprising a lighting encoder and a texture decoder, wherein the lighting encoder generates a set of texture latents based on the lighting latents and mesh latents, and wherein the texture decoder generates a texture map representing a texture of a face of the subject in the lighting of the environment based on the set of texture latents provided by the lighting encoder; and render an avatar of the subject in a view of the environment based on the texture map and a geometric representation of the subject.

8. The system of claim 7, wherein the lighting encoder translates the lighting latents to the set of texture latents, and wherein the texture decoder generates the texture map from the set of texture latents.

9. The system of claim 7, further comprising computer readable code to:

obtain a plurality of environment images; and train an environmental autoencoder based on the environment images, wherein the lighting latents are representative of a lighting of an image of an input scene into the trained environmental autoencoder.

10. The system of claim 9, wherein the lighting latents comprises a compressed representation of color in the environment.

11. The system of claim 7, wherein the computer readable code for rendering the avatar further comprises computer readable code to:

obtain a mesh representation of the subject; and apply the texture map to the mesh representation.

12. The system of claim 7, wherein the lighting latents comprises spherical harmonic coefficients for the environment.

13. A method for generating an avatar, comprising:

receiving lighting latents for an environment in which an avatar of a subject is to be displayed, wherein the subject is in a separate environment having different lighting than the environment in which the avatar is to be displayed;

determining mesh latents for the subject;

applying the lighting latents and the mesh latents to an inferred shading network comprising a lighting encoder and a texture decoder, wherein the lighting encoder generates a set of texture latents based on the lighting latents and mesh latents, and wherein the texture decoder generates a texture map representing a texture of a face of the subject in the lighting of the environment based on the set of texture latents provided by the lighting encoder; and rendering an avatar of the subject in a view of the environment based on the texture map and a geometric representation of the subject.

14. The method of claim 13, further comprising:

obtaining a plurality of environment images; and training an environmental autoencoder based on the environment images, wherein the lighting latents are representative of a lighting of an image of an input scene into the trained environmental autoencoder.

15. The method of claim 13, wherein rendering the avatar further comprises:

obtaining a mesh representation of the subject; and applying the texture map to the mesh representation.

16. The method of claim 13, wherein the lighting latents comprises a compressed representation color in the environment.

17. The method of claim 13, wherein the lighting latents comprises spherical harmonic coefficients or spherical Gaussians for the environment.

* * * * *